Jan. 28, 1930. G. G. EARL 1,744,872
FLUID SYSTEM
Filed April 7, 1922 4 Sheets-Sheet 1

GEORGE G. EARL INVENTOR.

BY Richey, Slough + Fales

HIS ATTORNEYS

Jan. 28, 1930.  G. G. EARL  1,744,872
FLUID SYSTEM
Filed April 7, 1922  4 Sheets-Sheet 2

GEORGE G. EARL  INVENTOR.

BY Richey, Slough + Fales

HIS ATTORNEYS

GEORGE G. EARL INVENTOR.

BY Richey, Alough & Fales

HIS ATTORNEYS

GEORGE G. EARL INVENTOR.

BY Richey, Hough & Fales

HIS ATTORNEYS

Patented Jan. 28, 1930

1,744,872

UNITED STATES PATENT OFFICE

GEORGE GOODELL EARL, OF NEW ORLEANS, LOUISIANA

FLUID SYSTEM

Application filed April 7, 1922. Serial No. 550,540.

This invention relates to fluid systems, and in general pertains to the governing, in a simple manner, of fluid flows passing through a conduit, and by means of apparatus which will operate positively and with little attention for long periods of time, and without derangement of the parts.

An object of my invention is to control a relatively large main flow of fluid, which may be variable, by a system of control involving a secondary flow herein called an "actuating flow," which may be made proportional to the main flow, and by suitably regulating the main flow by governing apparatus comprising apparatus operating under the control of the said actuating flow.

Another object of my invention is to provide a plurality of pathways for fluid flows, the flow of fluid therethrough being governed by balancing pressures from each of the flows to actuate an equal pressure movable division in order to maintain said flows proportional to one another at one point in the pathway of the flows. In accomplishing this I maintain the pressure of said flows equal to each other at one point in their pathway, or to govern the rate of flow of one of said flows at one point in its pathway by the rate of flow of the other of said flows.

Other objects of my invention comprise the provision preferably of some form of diaphragm operated balanced valve as a throttle valve on the main flow, weighted to close at a small difference of pressure on its two sides, in allowing any fluid pressure whose range of variation is within the required limits to act on one side of said diaphragm, and of providing a secondary flow which may be by-passed from the main flow around said throttle, or may either originate or terminate in the main flow or may be independent of the main flow both as to source and outlet; this secondary flow I call the "actuating flow," and by its regulation, from pressure operated members connected with the main flow, I cause this actuating flow to be proportional to the main flow, and to govern the main flow either in amount or in pressure maintained or omitting the proportionality of the two flows, to govern the main flow either in rate or pressure, the government being based upon the relative rate of ingress to and egress from the "actuating pressure system" through which the actuating flow is passed, wherein its pressure acts on one side of the "actuating diaphragm." I may also accomplish these same results with an actuating piston or float instead of with an actuating diaphragm, and I may employ a main throttle weighted to open instead of to close, when the pressure difference which operates it is small, and I accomplish these results with either by-passed, withdrawn, introduced, or parallel "actuating flows."

In the said illustrated systems of my previously filed co-pending applications, I have disclosed means whereby a portion of a main flow is by-passed and the by-passed portion of the flow is caused to operate a throttling valve in the main flow conduit and I find that this same inventive thought can be employed in practically all cases where the flow or pressure absorption of the main flow to be governed is too large or variable to be handled by an equal pressure division or equivalent float, both for proportional flows and for any form of pressure or difference of pressure regulation, such a system as is herein contemplated possesses the following advantages, the securing of which advantages are among the object of my present invention, for instance,—

First—the entire elimination of a third high pressure flow and pipe system,

Second—prevention of any possibility of over-reaching,

Third—for proportional flows the maintenance of proportionality at all conditions of operation, Fourth—much greater simplicity in adjustment and operation.

Another object of my invention is to provide a system wherein a very superior result may be secured in the prevention of over-reaching by the controlling apparatus therein enabling a very efficient system of rate of flow regulation to be had.

Another object of my invention is to combine in a fluid regulating system, proportional flow regulation of the small actuating flow with pressure regulation of the large flow, said flows being proportional and equal pressures at one point in the pathway of each flow being accomplished by suitable controlling apparatus.

My invention is of wide application and is capable of use in governing the rates of flow or the pressure of such flows for either liquid or gases.

The invention and its many applications will be better understood from the following description in which reference is had to the drawings wherein.

Figure 1:
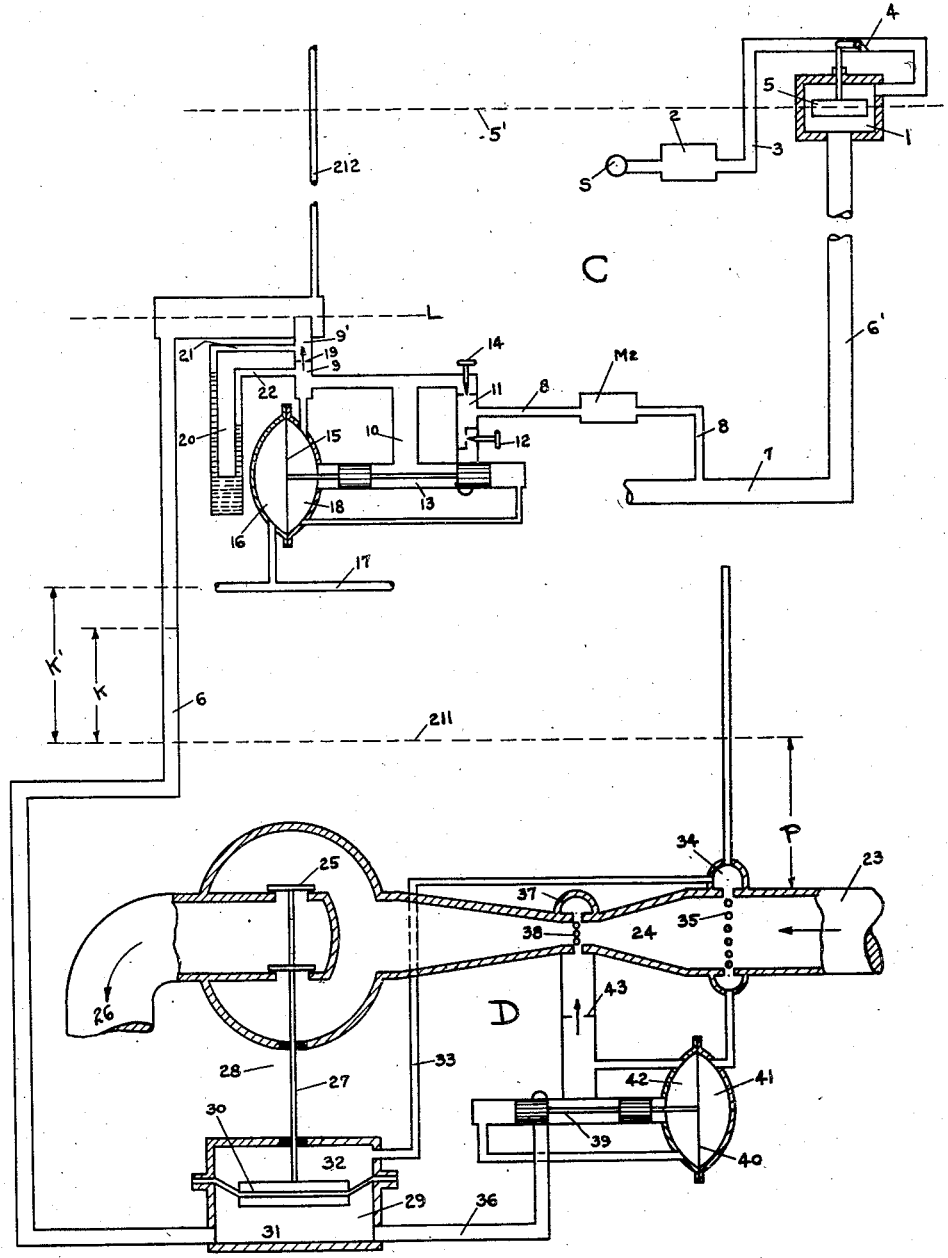
Fig. 1 illustrates an embodiment of my invention comprising a fluid system wherein, a main flow of fluid is controlled by a smaller flow, said flows being maintained proportional, by a controlling apparatus operating under the control of pressures from the said flow and in which apparatus over-reaching is prevented.

Referring now to the drawings:

Fig. 1 ilustrates by way of example only, the invention shown in connection with apparatus suitable for controlling the flow of water from a filter. Referring to this figure of the drawings, at S is shown a source of liquid pressure, for example, water, and this is connected to a float chamber 1 through a meter 2 and pipe 3, in which is a suitable valve 4 governed by a float 5 in the chamber 1. The float and valve are adjusted so that the level of the fluid in the chamber is along some desired level, such as 5'. The float chamber is connected through pipe 6' to pipe or conduit 7 for supplying fluid under constant pressure to the various controllers, one of which is indicated generally by the reference character C.

The controller arrangement consists of a duct or pipe 8 leading from the supply pipe 7 to a meter $M^2$, which in turn is connected to a constant level chamber 9' suplied by the orifice 19 through two channels 10, 11. The channel 10 leads from the meter through a hand valve 12 and the automatic diaphragm valve 13, while the passage 11 leads to the chamber 9 through a hand operated throttling valve 14. The diaphragm valve 13 is shown as a balanced piston arrangement connected to a flexible diaphragm 15. One side, 16 of this valve is connected to pipes 17 that may extend to a master controller for regulating the movements of the diaphragm to control the valve.

With this construction, when the valve 14 is closed, valve 12 will be opened, and then the flow of water into the chamber 9 will be controlled by the valve 13 through the master controller. It will be understood that inasmuch as the chamber 18 in the diaphragm valve is connected to the supply pipe 9, the pressure from the master controller will maintain a pressure of fluid in the supply chamber approaching orifice 19, equal to any pressure which may exist in the master pressure pipe 17. Whenever it is desired to change the method of control, valve 12 may be closed, and valve 14 opened to throttle the flow of fluid through the orifice co-operating therewith, to pass any desired amount of fluid into the chamber 9, the rate of flow from said chamber being indicated by the difference in pressure on the two sides of orifice 19 as shown on the manometer 20.

The chamber 9' overflows into what I call an actuating pipe 6, and the water overflows at the constant level L. There is a constriction 19 in the chamber 9 and a manometer 20 is connected on opposite sides of the constriction by pipes 21 and 22, so that the difference in level between the fluid in these pipes will indicate the rate of flow of water into the actuating pipe 6, as will be clearly understood.

The apparatus to be controlled by the previously described arrangement is shown as a main pipe or conduit 23 leading from some source, such as a filter, for example, and this pipe passes through a Venturi arrangement 24, and is connected to a valve 25, which is shown of the balanced type. The pipe 26 is connected to the valve 25 to discharge the fluid into a clear well, for instance. Valve 25 has a stem 27 passing through a suitable packing joint 28 into a diaphragm chamber 29, and is connected to a weighted diaphragm 30. The lower part of the diaphragm chamber 31 is joined to the pipe 6, so as to be subject to the pressure of the water or other fluid therein, while the upper chamber 32 is joined through pipe 33 to an annular chamber 34, or equivalent, around the pipe 23, and connected thereto by suitable openings 35. The lower chamber 31 is connected through pipe 36 to an annular chamber 37, or equivalent, around the constricted portion of the venturi 24, to the interior of which it is joined by suitable openings 38. The flow of water through pipe 36 is controlled by a balanced piston valve 39, which is regulated by a flexible diaphragm 40. The annular chamber 34 is connected to the space 41 on one side of the diaphragm 40 and the chamber 37 is connected to the other space. The pipe leading from the chamber 37 to the space 42 and the conduit 36, through the valve 39, also has a constriction 43.

With the construction described, the operation will be as follows: With any pressure head, such as P, acting on the top of diaphragm 30 it will require some greater pressure P plus $K^1$ to overcome the weight and pressure tending to force the valve 25 down. As long as the pressure in chamber 31 of the diaphragm 30 is less than this limiting pressure P plus K, the valve 25 will be closed and no water will flow through the pipe 23 from the filter.

To transmit the desired flow from the filter, the operator will open the throttling valve 14, the necessary amount, while the valve 12 remains closed. This will introduce a set or governed rate of flow entering the actuating pipe 6, and making its pressure felt on the lower side of diaphragm 30, and upon the upper side of which diaphragm, the pressure at the approach to the venturi 24 is applied through pipe 33, and the weight of the moving parts of the diaphragm 30 and the throttle 25 are acting to close said throttle; with any pressure, as P at the level 211, it will require some greater pressure, as P plus K or P plus K' to overcome the weight and cause flow to pass though the throttle 25 at all, and as soon as such flow starts to pass this throttle, a proportional flow thereto will be supplied to the orifice 43; by the action of diaphragm 40, the pressure under the diaphragm 30 will always be sufficient to thus supply such a proportional flow.

In this way a set rate of flow is introduced to the pipe 6 passing under the diaphragm 30, and withdrawing from under the diaphragm 30 a flow proportional to whatever main flow is passing the throttle 25; it therefore follows that if the rates of ingress and egress to and from the chamber 31 are equal, the diaphragm will be maintained stationary, and if the ingress exceeds the egress, the diaphragm will be moved upwardly and it will be moved downwardly if the ingress is less than the egress.

If there is much difference between the rates of ingress and egress, the diaphragm 30 will move rapidly, and with its motion slowing down gradually to zero when the difference in the rates of ingress and egress gradually come to zero; rapid regulation of the main flow is therefore provided by inducing a set or governed rate of flow, which is always proportional thereto, without possibility of any over-reaching of the main flow controlling apparatus such as the diaphragm 30 and diaphragm operated valve 25.

If for any reason the main flow cannot respond to the regulated or set flow coming through the actuating pipe 6, the diaphragm 40 will refuse to pass more than a proportional flow to the orifice 43, and the diaphragm 30 will be forced upwardly to its extreme position wherein the throttle 25 will be caused to take a wide open position, and the actuating flow pipe 6 will fill above the level L up into the vent and sight tube 212, thus putting additional back pressure on the orifice 19 and reducing the flow through it, but even under such conditions, the meter $M^2$ will record and the manometer 20 will indicate the actual rate of flow in the main line conduit 23.

The whole operation of the filter therefore, to open or close or set any required rate or throw to any governed rate, is effected by manipulation of valves 14 and 12, and its effect is indicated at manometer 20. This makes a very simple, cheap, but highly efficient and accurate flow rate controller, and in which over-reaching is actually prevented.

The system of Fig. 1 represents one unit of what may be a multi-unit control system. A flow from the source S is metered by the meter 2 and enters tank 1, its entrance being regulated by the float 5 operating the valve 4 to maintain a constant level or pressure $5^1$ in tank 1 acting on pipe $6^1$ and 7, from which any number of small flows may be drawn. The pipe 8 takes off one of said small flows through the meter $M^2$. Discharge from this meter can be hand regulated to any amount by adjustment of needle valve 14, to show any desired discharge through the orifice 19 on the manometer 20, and any rate set will remain constant as long as there is a free overflow at level L from pipe $9^1$. Because the pressure at the entrance of pipe 8 is constant, the resistance to flow for any given position of valve 14 is constant for pipe line meter and setting of valve 14 and for orifice 19 and the resistance on the discharge side of the orifice 19 is constant at atmospheric pressure at level L.

If valve 14 is closed, and valve 12 is opened, then we will have a pressure on the approach side of orifice 19 equal to any pressure which may exist in the pipe 17 maintained by the action of the diaphragm 15 operating the valve 13 to admit flow through the pipe 10, and if the pipe 17 carries any constant or varying master pressure, this pressure will dominate the pressure approaching orifice 19, while atmospheric pressure at level L of overflow of pipe $9^1$ will dominate the pressure on the discharge side of said orifice. Therefore, by the manipulation of the valve 14, any desired rate of flow can be caused to overflow at level L, or by closing 14 and opening 12 said overflow can be caused to be governed by any master pressure in 17. This overflow escapes through pipe $6^1$ into the actuating pressure system $6^1$—31—36. A pressure of water exists on pipe 23 equal to any pressure P, an outlet exists at 26 of lower pressure and the throttling valve 25 closed by the weight of its parts until the pressure under diaphragm 30 exceeds the pressure over said diaphragm by a certain amount K, prevents flow from 23 to 26. Any given rate of flow entering pipe 6 will fill system 6—31—36 to level K plus P, and then begin to lift diaphragm 30 and open valve 25 which starts flow from 23 to 26. When such flow starts, a proportional flow thereto is set up through the orifice 43 by the action of diaphragm 40 as covered in my introduced proportional flow case the valve 39 moved by the diaphragm 40 to admit flow from 36 to maintain the pressure on approach of orifice 43 equal to pressure at approach 34 to restriction 38. So long as the flow entering $6^1$ is greater than the flow escaping at orifice 43, the water will accumulate in 31 and the valve 25 will be more and more opened. The diaphragm 30 being a weighted diaphragm will start to open at some pressure P plus K, and will require an increasing pressure as it is more and more opened up, to some higher pressure P plus $K^1$ when it is fully opened. When flow first starts into $6^1$ and reaches level above P, it will close valve 39, if same should happen to be open, to practically no discharge, so that all of the approaching flow through $6^1$ will accumulate under 30 in chamber 31 starting to open valve 25 rapidly. By the time 25 is open enough to create a flow at restriction 38 and through orifice 43 that consumes 1/2 of the flow approaching from $6^1$, the rate of opening will be only one-half as fast. When 9/10 of the flow from $6^1$ is taken as a proportional flow through 43, then only 1/10 of said flow will be operating to lift valve 25, etc., until the whole of said flow is absorbed by orifice 43 as a proportional flow when more of it will be available to open 25 further, and the amounts of water entering and leaving the actuating pressure system will be equal, and the diaphragm 30 frozen in the position required to maintan this rate of flow.

If the pressure at 23 or 26 changes, and thereby changes the rate of flow for this position of valve 25, then the flow drawn through orifice 43 will change proportionately, and the storage under diaphragm 31 will be increased or reduced to restore the rate of main flow 23—36 to the rate of flow entering at $6^1$. The closing of the valve 14 or 12 supplying pipe 6 will reverse the above described procedure. The water stored in $6^1$—31—36 will be drawn upon for a proportional flow while the valve 25 is closing until said valve is closed when no flow from 23 to 26 will exist, and no supply for a proportional flow will be available.

If for any reason the flow 23—26 is not sufficient to utilize the flow entering $6^1$, the valve 39 rejects the excess flow and heads the approaching flow in $6^1$ back over the overflow level of pipe 9 at L, and if no flow exists at 23—26 then $6^1$ will fill vent tube above orifice 19 to level $5^1$ and a flow will also exist through meter $M^2$. Under all conditions the aggregate of the flow through $M^2$ is proportional to the aggregate of the flow 23—26, and the meter and recording device $M^2$ and the indicating device 20 on the small flow will measure and record the aggregate main flow and indicate the rate of main flow which it will obtain and maintain. The meter $M^2$ measures not only the flow to this individual filter, but may supply and measure flow to any number of similarly governed filters and that any flow passing $M^2$ must therefore integrate the output from all filters so actuated, since no flow can escape from source S except to maintain the constant level 5' in tank 1 nor escape from said tank 1, except as a proportional flow to a flow through the one or more controllers actuated by it.

Figure 2:
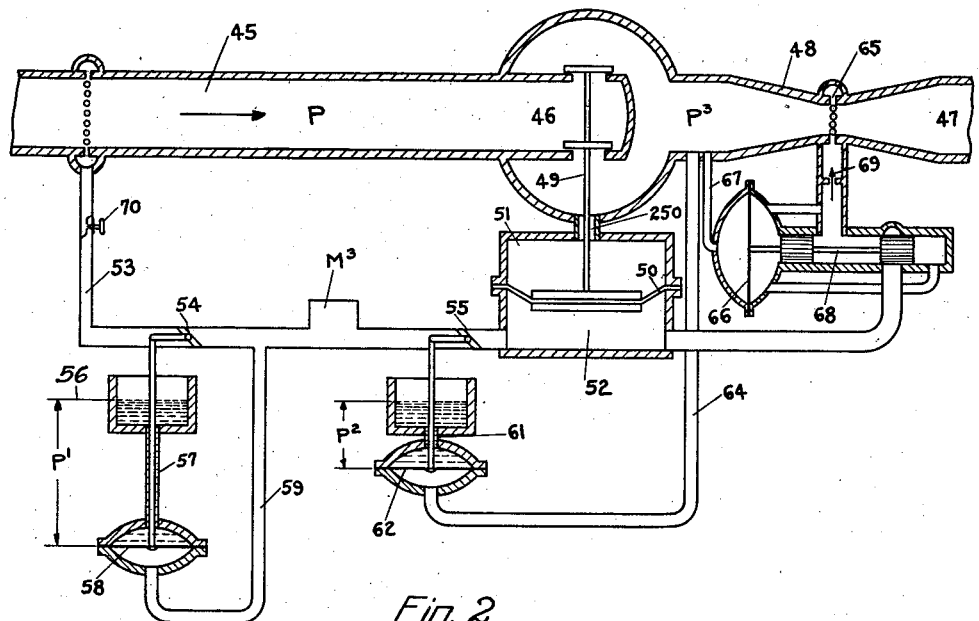
Fig. 2 illustrates a second embodiment of my invention wherein a varying high fluid pressure is reduced to a constant lower pressure by regulation of the flow of fluid.

In the system of Fig. 2, proportional flow regulation is associated with a means for accomplishing the regulation of pressure and contains means for metering at constant pressure, and which is adaptable for regulating the flow or pressure of gas and metering the flow of gas at constant pressure.

In this figure, I have shown a specific embodiment of my invention wherein a governing arrangement is provided comprising a by-passed proportional flow as of a gas maintaining a constant pressure in a main flow, and which proportional flow may be measured at a constant predetermined pressure. In the system of Fig. 2, any varying high pressure P, is first reduced in the actuating proportional by-passed flow in the conduit 53 to a constant pressure by means of a valve 54, said pressure being equal to the pressure of a liquid column $P^1$, which may be a column of mercury; at this pressure it passes the meter $M^3$ giving therefore correct measurement, at constant pressure, for a gas flow.

After passing the meter $M^3$, the pressure is further cut down by a valve 55 adapted to be actuated by the flow carried on the liquid column 61, which may be a column of water. Under the column of liquid 61 which exerts a pressure on the diaphragm 62, there is exerted a counter pressure $P^3$ communicated to the space below the diaphragm 62 by the conduit 64, the pressure $P^3$ being the pressure which it is desired to maintain equal to the pressure $P^2$ exerted by the liquid column 61.

The valve 55 will therefore be moved toward open or closed position, depending upon whether the pressure $P^3$ is in the main conduit, and which communicates by a conduit 250 with the space 51 above the diaphragm 50, is a greater or less pressure than the pressure $P^2$ in order to maintain any necessary pressure $P^3$ plus K under the actuating diaphragm 50 in the space 52, which may be required to maintain equality between the pressures $P^3$ and $P^2$.

By construction $P^3$ plus K, for all positions and conditions of operation being always a lesser pressure than the pressure exerted by the liquid column 57 and which pressure is indicated as $P^1$, there will therefore always be sufficient pressure under the diaphragm 50 for operation, and also enough pressure to maintain a proportional flow through the orifice 69; we have therefore, a by-passed proportional flow of a gas passing through the meter $M^3$, and controlling apparatus to maintain a constant pressure in a system P, and measured at a constant predetermined higher pressure, the system P being a high pressure system, the valve 54 reduces this to a constant pressure still well above $P^3$, say $P^1$, represented by the difference between level 56 and level 58. Meter $M^3$ measures flow from valve 54 at constant pressure $P^1$, less than P and more than $P^3$ which is required to be maintained and which is equal to $P^2$ where diaphragm 62 operates valve 55 to increase or decrease flow entering 52 and raise or lower diaphragm 50 to operate valve 46 to maintain the pressure $P^3$ equal to $P^2$. The get-away through orifice 69 is proportional to the flow through the restriction 65 by the action of the diaphragm 66 and valve 68. By adjusting valve 70 so that the maximum flow which it can deliver at the pressure difference P—P', is not greatly more than the maximum delivery that will be required through the orifice 69, this system of pressure regulation will show a very much better characteristic as against overreaching than the same system if the proportional flow get away were eliminated and a constant rate of "get away" substituted.

Figure 3:
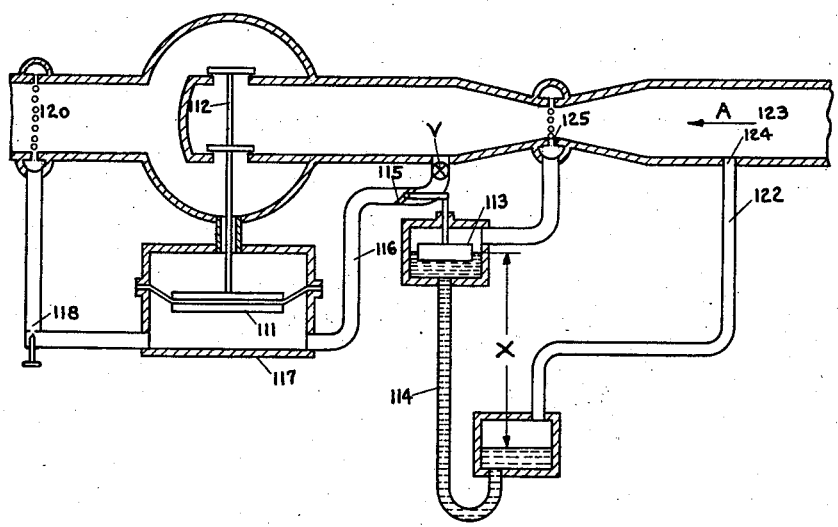
Fig. 3 illustrates the use of one form of rate of flow controller in which a pressure difference in a main conduit at separated portions thereof is maintained equal to a predetermined pressure.

The system of Fig. 3 illustrates the use of one form of rate of flow controller whereby a pressure difference in a main conduit at separated portions thereof is maintained equal to the pressure exerted by a column of "heavier liquid" which re-acts against the said difference in pressure. This system is one so organized as to utilize the "actuating pressure system" to regulate the main throttle in a fluid flow conduit to maintain a given difference in pressure between points in line of such fluid flow. Referring to the drawing of Fig. 3, 123 is the high pressure source, 120 is low pressure outlet, and valve 112 closes by its weight of parts so long as pressure under 111 does not exceed pressure over 111 by some predetermined amount, K to $K^1$.

If valve V is closed 112 must be closed because the pressure on both sides of 111 is equal. Open valve V, and until mercury column X begins to close valve 115, high pressure water will flow into pipe 116 building up a head on orifice 118 and lifting 111, thus rapidly opening valve 112. (To put system in service valve V should be opened slowly.)

When flow through valve 112 begins to create a pressure difference X, float 113 will begin to close valve 115, entirely closing it if such difference in pressure exceeds X.

There is no proportioning of the two flows in this case, and no regulation of the pressure of either flow, but just plain rate of flow regulation of the flow through valve 112 to keep the difference of pressure 124—125 equal to X. In this regulating system the control of the rate of flow of a liquid, or of a gas in cubic feet is accomplished without the necessity of a proportional flow, nor any definite pressure at any point, requiring only a definite difference of pressure which is maintained between points in line with the flow.

Figure 4:
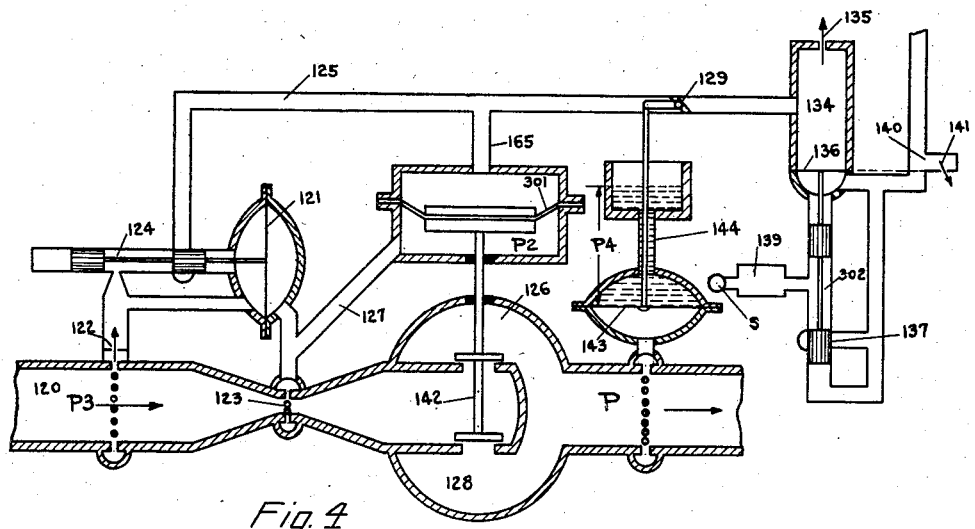
Fig. 4 illustrates a system of fluid regulation wherein an actuating pressure, so called, is maintained in a secondary minor liquid flow, withdrawn from the main flow, which regulates the main flow so as to maintain it at a constant pressure.

Fig. 4 illustrates a system of regulation employing the "actuating pressure" system, and an actuating flow withdrawn from the main flow for the regulation of the main flow to maintain it at a constant pressure. In the following description this system will be explained under the assumption that the large flow in the main conduit 120 is a gas flow, and that the so-called "heavier liquid" contained in the column 144 is a column of mercury, and that the fluid from the source S is water.

In this figure, the diaphragm 121 actuates a valve 124 to cause the withdrawal of a flow of gas proportional to the main flow in the conduit 120, such proportional flow passing through the orifice 122 and through the valve 124 and conduit $125^1$, connecting with the top side of the diaphragm 301 by a branch conduit 165; the diaphragm 301 is adapted to operate the main throttle 142 to regulate the flow through the main conduit, said diaphragm being weighted to close the valve whenever equal pressures are exerted on its two sides, and to open the valve when the pressure above the diaphragm reaches an approximate value K less than the value of pressure under the diaphragm, that is, if the pressure under the diaphragm is designated as $P^2$ communicated by the conduit 127 from the venturi 123, the value of pressure above the diaphragm to open the valve will be required to be of a value $P^2$ minus K.

The diaphragm 143 carries a load of relatively heavy liquid such as mercury exerting a pressure on the diaphragm 143 of value $P^4$, and which diaphragm in turn operates the valve 129 if the pressure P exceeds the pressure $P^4$, the valve 129 is closed, and any flow passing through the conduit 125 operates to close the throttle 142. Whenever P is less than $P^4$, the valve 129 is opened and permits the escape of fluid such as gas through the conduit 125 and opens the throttle 142. The throttle 142 will only be open when the pressure over the diaphragm 301 is of a value less than $P^2$, or $P^2$ minus K, that is low enough to allow a proportional flow through the orifice 122. Therefore, there will always be a proportional flow through the conduit 125 to the flow through the main line, and also there will be a pressure P equal to $P^4$ maintained on the discharge side of the main throttle 142; if these flows are, as under the above assumption, gas flows, and the flow from 125 escapes to the atmosphere through an orifice 135 in the chamber 134 above the diaphragm 136, and there will be a gas pressure on the diaphragm 136 equal to the gas pressure on the orifice 135. The diaphragm 136 will operate to draw a water supply from the source S, through the meter 139 to maintain an equal water pressure acting on the orifice 141, and there will be therefore, by virtue of the movements of the diaphragm 136 operating in response to any difference of pressure from the gas in the chamber 134 and the water in the chamber just below the diaphragm 136 causing the valve 302 to regulate the flow from the source S, to create a proportional flow of water through the valve to the gas flow through the orifice 135.

In the system as above described, the flow of water through the meter 139 being thus made proportional to the flow of gas or other fluid, which may also be water, through the conduit 125, and since the flow through the conduit 125 is also proportional to the main flow through the conduit 120, the meter readings at 139 will give a correct measurement of the main flow, being merely to be multiplied by a given number to correctly show the main flow in units of weight of flow.

Figure 5:
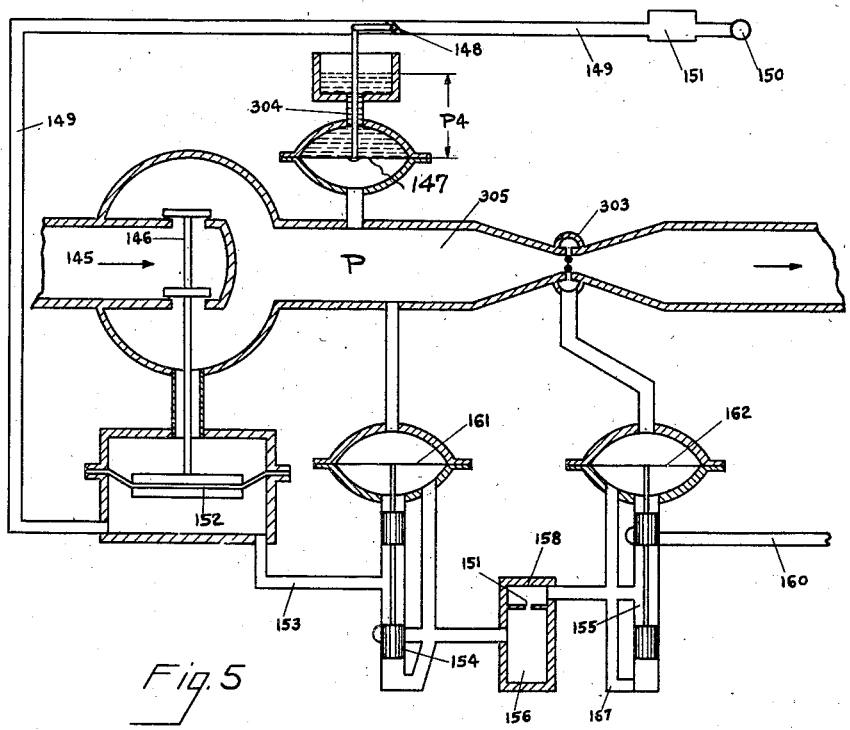
Fig. 5 illustrates a different embodiment of my invention wherein a parallel flow, maintained proportional to the main flow, but independent thereof, is adapted to regulate the main flow, the main flow being regulated to maintain a constant pressure therein.

Fig. 5 shows another modification of my invention wherein I utilize a parallel flow proportional to a main flow, but independent thereof, to regulate the main flow, the main flow being metered by a meter placed in the proportional flow, the main flow being regulated to a constant pressure.

In the system of Fig. 5, a flow from the source 150, say of water, measured by a meter 151 placed in line with such flow, is regulated by a valve 148 to vary the position of a diaphragm 152, the flow being carried from the source 150 by a conduit 149 to the chamber below the diaphragm 152. The diaphragm 152 is adapted to operate the throttle valve 146 to regulate the flow through the main 145. This system employs other diaphragms 161 and 162, the diaphragm 161 sustaining on its upper side a pressure P from the main, and the diaphragm 162 having on its upper side a pressure from the throat 303 of the venturi. The valve pistons 154 and 155 are adapted under the control of the diaphragms 161 and 162 to maintain the flow through the conduits 149 and 153, chamber 156, orifice 157, chamber 158 and conduit 160, which is proportional to the flow through the main 145. The valve 154 controls the egress of fluid below the diaphragm 152 in the chamber 156 below the orifice 157, while the valve 155 operating under the control of the diaphragm 162 controls the passage of fluid in the chamber 158 to the discharge pipe 160. The two diaphragms 161 and 162 will therefore pass a flow through the pipe 149 that is always proportional to the flow of water through the venturi, and while this flow is being maintained in proportional relation to the main flow, by virtue of the controlling of said proportional actuating flow and said main flows, the valve 148 will move toward open or closed position in response to the movements of the diaphragm 147 to maintain the valve 146 in such a main fluid flow regulating position that the pressure on the discharge side of the throttle 146 will always be equal to the pressure exerted by the column of liquid such as mercury shown at 304, and which exerts a pressure equal to $P^4$.

In such a system as above described, the pressure in the main may be in a different fluid, and from a high pressure source, governed by the main throttle 146 under the control of the diaphragm 152, the escape of flow from under the diaphragm 152 being in turn governed by the diaphragms 161 and 162 to maintain pressures on the two sides of the orifice 157 equal to the pressures at the approach 305 and the throat 303 of the venturi 305—303. Thus we have a parallel proportional flow of one fluid through an orifice 157 acting to maintain the pressure P constant in the flow of another fluid as in the conduit 145, and to measure and record said last named flow.

Figure 6:
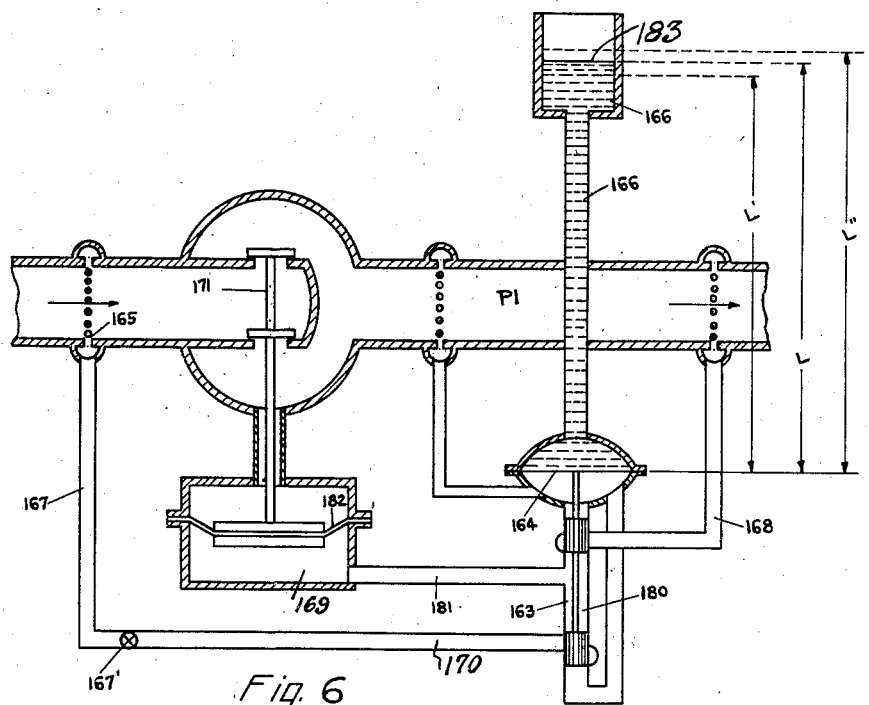
Fig. 6 illustrates another embodiment of my invention wherein a varying high fluid pressure is reduced to a lower constant pressure under the control of the pressure of a column of liquid.
Figure 7:
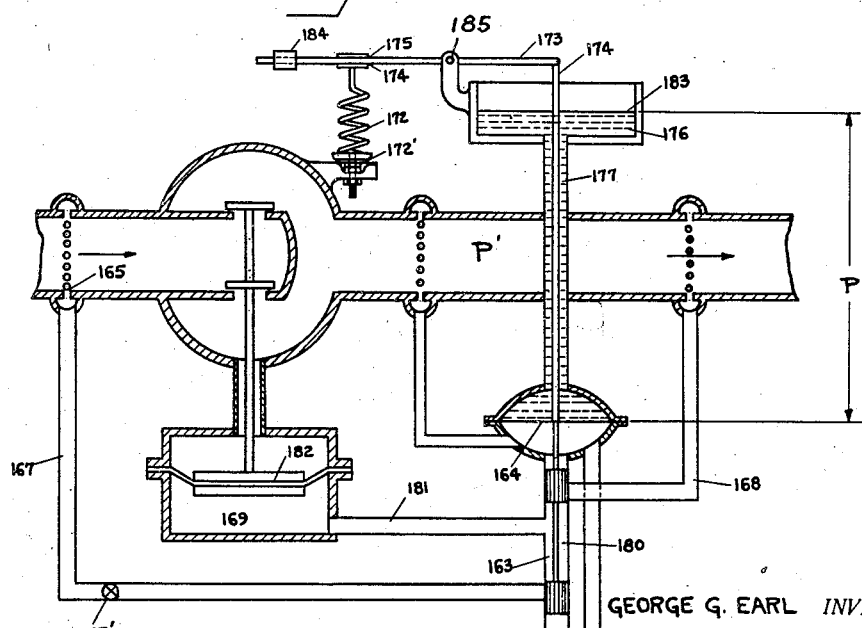
Fig. 7 illustrates a modification of the system of Fig. 6, wherein a biasing spring or equivalent means is employed to modify the control provided in the system for the regulating throttle valve.

Figs. 6 and 7 illustrate another embodiment of my invention wherein a varying high pressure is reduced to a lower constant pressure, and in the system of these figures, the return to neutral position of a pilot valve is utilized, the return being accomplished under the control of the fluctuation of a heavier liquid level as Fig. 6, and also controlled by the use of a retractile spring as illustrated in Fig. 7.

In Fig. 6, I have shown a valve 163 that is controlled by a diaphragm 164, said diaphragm being subjected on its lower side to the pressure $P^1$ on the discharge end of the main conduit 165, said diaphragm being subjected on its upper side to the pressure of a liquid column 166. The valve 163 is shown as being of the piston type, and is what I call a pilot valve. Valves of this kind are never completely tight as against fluid pressures especially when of the sensitive type preferable for use under most conditions, and in its neutral position as shown.

In the position shown, and in any other position, some flow will escape from the pipe 167 through the chamber 180 to exit through pipe 168, and since the chamber 180 is connected through pipe 181 to the chamber 169 under the diaphragm 182, the above structure being comprised in my "actuating pressure system" of said diaphragm, it is obvious that the amount of fluid in the system 180, 181, 169 will depend upon the relative rates of ingress and egress into and from said system, which will be dominated by the position of the valve 163, and that this valve at its neutral position as illustrated, or at about that position, the rates of ingress and egress will be equal.

Therefore, in the system of Fig. 6 and also the same applies to that of Fig. 7, although the pilot valve of the piston type 163 does not actually admit flow into or withdraw flow from the actuating pressure system connected with the pipe 170 without leakage, since such a valve must work freely and always will have leakage passing from the pipe 165 through the pipe 163 to the low pressure side of the system even though the valve pistons as shown apparently cover both ports, but the actual flow either in or out will be lessened and the amount entering and leaving the actuating pressure system will be equal to one another only at about the central position of the pilot valve, and in order to cut down the resistance of the piston to motion, I make the ports with openings extending all around the pistons instead of only on one side.

Whenever the pressure P equal to the pressure of the liquid column 166 open to atmosphere at its upper surface, is the same as the pressure $P^1$ on the discharge side of the conduit 165, the valve 163 will take the illustrated neutral position; now should the pressure $P^1$ fall below that of the pressure P, the diaphragm 164 will lower and the surface of the fluid 166 will fall from level L to level $L^1$, and the valve 163 will be moved downwardly to pass more fluid through the pipe 167, and to some extent reducing the flow through 168 and building up pressure in the chamber 169 below the diaphragm 182. This automatically operates the throttle 171 to admit a greater flow from the high pressure source into the discharge portion of the conduit 125 so as to build up the pressure $P^1$ sufficiently to again restore the diaphragm 164 to its normal neutral position illustrated.

Should for any reason the pressure $P^1$ be increased over the pressure exerted by the column of liquid 166, the diaphragm 164 will be raised causing the level of the liquid 166 to be of some such height as level $L^{11}$, lifting the movable elements of the piston 163 to cut down the flow from the conduit 167 to the chamber 169 below the diaphragm 182, and to establish communication through the chamber 163 between the conduits 181 leading from the chamber 169 to the conduit 168. This will cause the diaphragm 182 to lower, thus increasing the restriction by the throttle 171 of the flow from the high pressure source 165 resulting in a drop in pressure $P^1$ to balance the pressure exerted by the liquid column 166 of value P.

By utilizing the above means for restoring the pilot valve 163 to neutral position, it is evident that the rates of ingress and egress from the actuating pressure system 181, 163 may be very rapidly varied for any predetermined extent of departure from the desired pressure conditions, and the ingress and egress rates of flows are instantly brought to equality at the moment the desired conditions of pressure are reached. By means of the structure herein set forth accomplishing this desirable result, over-reaching is prevented and a smooth, steady, continuous control over the pressure $P^1$ maintaining it constant in spite of large and rapid fluctuations of higher pressure on the supply side of the conduit 165, and rapid and violent fluctuations of the diaphragm 164 are dampened contributing to the elimination of over-reaching.

Fig. 7 illustrates a system identical with that of Fig. 6 except that the surface 183 of the liquid column 177 is of larger area than that of the column 166 of Fig. 6, and also a mechanism comprising a spring 172 adapted to engage at 174 and 175, a pivoted arm 173 which may be counterbalanced at 184 and which is pivotally connected at 185 to a rod 174 secured to the mid-point of the diaphragm 164.

In the system of Fig. 7, the spring 172 is itself in neutral position and having no effect whatever on the diaphragm operating valve 163 when said valve itself is in neutral position; the function of the spring is to exert a pressure in either direction to return the valve to practically neutral position when the pressures under and over the diaphragm 164 are nearly equal; instead of allowing said diaphragm to rise rapidly and greatly when the pressure under it is greater than the pressure over it, and to fall too rapidly and too far when the pressure under it is less than the fluid pressure P, which otherwise might tend to cause overreaching in the government of the main throttle, or too violent motion thereof, as pointed out hereinbefore. The spring 172 comes into effect when the valve 163 leaves its neutral position. Thus when the neutral position of the valve 163 is departed from to any great extent, and maximum amount of corrective effort is applied to the valve and the amount of the corrective effort is gradually decreased to zero when the correction is effected instead of having the corrected effort working practically at its maximum effect until it has slightly exceeded the corrective effect desired, and then instantly starting to work with equally large effect in the opposite direction as might otherwise be the case without the provision of the instrumentalities herein provided.

By comparing the systems of Figs. 6 and 7, it will be noted that the area of the surface of liquid 166 in Fig. 6, not employing a spring, is smaller than that of the liquid surface 183 of the liquid 177 of Fig. 7 which contains a spring, each of these instrumentalities accomplishing substantially the same effect. The spring shown in Fig. 7 is never in compression nor tension when the valve is in neutral position, but in either system the diaphragm is neither weighted or spring resisted at its neutral position. However, in the system herein disclosed I might employ weighted or spring resisted diaphragms to a better effect than could be done in systems of other design, but this would not give as good a result as the use of the equal fluid pressure diaphragm herein shown, the difference being in the degree of accuracy capable of being secured.

Having thus described my invention in its different phases in a plurality of embodiments, I am aware that numerous and extensive departures may be made from the embodiments herein illustrated and described, but without departing from the spirit of my invention.

I claim:

1. In a fluid system, a conduit adapted to pass a fluid flow, a balanced throttling valve in said conduit, said valve being weighted, a fluid containing cell, a movable wall for the said cell, said wall controlling the movement of the said valve, a second conduit for fluid flow adapted to convey an actuating flow of fluid, regulating means for the said actuating flow, fluid pressure actuated mechanism adapted to be operated under control of pressure from the main flow, controlling the said actuating flow whereby the said actuating flow is maintained proportional to the said main flow, said actuating flow being adapted to pass through the said cell to move the said movable wall to cause it to open the said valve, according to the fluid pressure exerted by the said actuating flow in the said cell.

2. In a fluid system, a conduit adapted to pass a fluid flow, a throttling valve in said conduit, a fluid containing cell, a movable wall for the said cell, said wall controlling the movement of the said valve, a second conduit for fluid flow adapted to convey an actuating flow of fluid, regulating means for the said actuating flow, fluid pressure actuated mechanism adapted to be operated under control of pressure from the main flow, controlling the said actuating flow whereby the said actuating flow is maintained proportional to the said main flow, said actuating flow being adapted to pass through the said cell to move the said movable wall to cause it to open the said valve, according to the fluid pressure exerted by the said actuating flow in the said cell.

3. In a fluid system, a conduit adapted to pass a fluid flow, a throttling valve in said conduit, a fluid containing cell, a movable wall for the said cell, said wall controlling the movement of the said valve, a second conduit for fluid flow adapted to convey an actuating flow of fluid, regulating means for the said actuating flow, fluid pressure actuated mechanism adapted to be operated under control of pressure from the main flow, controlling the said actuating flow whereby the said actuating flow is maintained proportional to the said main flow, said actuating flow being adapted to pass through the said cell to move the said movable wall to cause it to open the said valve, according to the fluid pressure exerted by the said actuating flow in the said cell, a means to communicate a pressure from the said main flow to the opposite side of the said movable wall, to oppose the action of the said actuating flow pressure upon the said wall.

4. In a fluid system, a conduit adapted to pass a fluid flow, a throttling valve in said conduit, a fluid containing cell, a movable wall for the said cell, said wall controlling the movement of the said valve, a second conduit for fluid flow adapted to convey an actuating flow of fluid, regulating means for the said actuating flow, fluid pressure actuated mechanism adapted to be operated under control of pressure from the main flow, controlling the said actuating flow whereby the said actuating flow is maintained proportional to the said main flow, said actuating flow being adapted to pass through the said cell to move the said movable wall to cause it to open the said valve, according to the fluid pressure exerted by the said actuating flow in the said cell, and controlling means adapted to control the pressure of said actuating flow.

5. In a fluid system, a conduit adapted to pass a fluid flow, a throttling valve in said conduit, a fluid containing cell, a movable wall for the said cell, said wall controlling the movement of the said valve, a second conduit for fluid flow adapted to convey an actuating flow of fluid, regulating means for the said actuating flow, fluid pressure actuated mechanism adapted to be operated under control of pressure from the main flow, controlling the said actuating flow whereby the said actuating flow is maintained proportional to the said main flow, said actuating flow being adapted to pass through the said cell to move the said movable wall to cause it to open the said valve, according to the fluid pressure exerted by the said actuating flow in the said cell, and controlling means adapted to control the pressure of said actuating flow, said controlling means comprising fluid pressure operating mechanism.

6. In a fluid system a main flow of fluid, a second fluid flow, fluid flow regulating means adapted to continuously variably restrict said second flow so as to maintain proportionality between the said flows, and fluid pressure regulating means according to the pressure of fluid in the second flow to regulate the pressure of fluid in said main flow.

7. In a fluid system a main flow of fluid, a second fluid flow, fluid flow regulating means adapted to variably restrict the second flow to maintain proportionality between the said flows, regulating means operable by pressure of the fluid at a point in the regulated flow of the second conduit adapted to regulate the pressure of fluid at a point in the said main flow, and metering means to measure the said second fluid flow.

8. In a fluid system, the combination with a main conduit, a branching conduit adapted to convey a flow by-passed therefrom, between points of differing pressures, a plurality of valves controlling the said by-passed flow, one of said valves operating under the control of pressure in the said branching conduit at a point on the outlet side of said valve, adapted to variably lower the pressure in the said branching conduit to maintain it at a constant pressure, a throttle valve in the said main conduit, said throttle valve having a member actuated by opposing fluid pressures, controlling means for a second one of said valves adapted to maintain the flow through the said branching conduit proportional to the flow through the said main conduit, pressure operated means, operable by pressure derived from the outlet side of the said throttle valve adapted to operate another of said valves in the said branching conduit and a pressure cell having a movable wall.

9. In a fluid system, a main conduit, a throttle valve for the said conduit, a by-passing conduit adapted to convey fluid around the said throttle valve, a second valve controlling the flow through the said by-passing conduit, said last named valve being responsive to differences in pressures exerted by the fluid at a point in the main conduit, and that exerted by the fluid at a point in the by-pass conduit, fluid pressure operated means for actuating the said throttle valve, said means being variably operable according to the varying pressure of fluid in the so-controlled by-passing conduit flow.

10. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being operable under the control of pressure in the said second conduit, one of said communicated pressures being derived from the fluid flow in the main conduit.

11. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being operable under the control of pressure in the said second conduit, one of said communicated pressures being derived from the fluid flow in the main conduit, and the other said opposing pressure being derived from said second conduit fluid flow.

12. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being operable under the control of pressure in the said second conduit, and said second conduit being adapted to convey a divisional flow of said main conduit flow, between points of different pressures in the main conduit.

13. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduit a fluid flow, means to communicate opposing pressures to both said cells, said balanced member adapted to control the flow through said second conduit, said regulating valve being operable under the control of pressure in the said second conduit, one of said communicated pressures being derived from the fluid flow in the main conduit, the other said opposing pressure being derived from said second conduit fluid flow, and said second conduit being adapted to convey a divisional flow of said main conduit flow, between points of different pressures in the main conduit.

14. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressure to both said cells, said balanced member adapted to control the flow through said second conduit, said regulating valve being operable under the control of pressure in the said second conduit, one of said communicated pressures being derived from the fluid flow in the main conduit, said second conduit being adapted to convey a divisional flow of said main conduit flow, between points of different pressures in the main conduit, means comprising said balanced member adapted to maintain proportionality between both the said flows.

15. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, means comprising said balanced member adapted to maintain proportionality between both the said flows, means operative responsive to pressure of fluid at a point in the second conduit to operate said regulating valve.

16. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being operable under the control of pressure in the said second conduit, said second conduit adapted to convey a fluid pressure from a source at higher pressure to a relatively lower pressure point in the said main conduit.

17. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow pressure, one of said communicated pressures being derived from the fluid flow in the main conduit.

18. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow pressure, one of said communicated pressures being derived from the fluid flow in the main conduit, the other said opposing pressure being derived from said second conduit fluid flow.

19. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow pressure, one of said communicated pressures being derived from the fluid flow in the main conduit, the other said opposing pressure being derived from said second conduit fluid flow, said second conduit being adapted to convey a divisional flow of said main conduit flow, between points of different pressures in the main condut.

20. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow pressure, one of said communicated pressures being derived from the fluid flow in the main conduit, the other said opposing pressure being derived from said second conduit fluid flow, said second conduit being adapted to convey a divisional flow of said main conduit flow, between points of different pressures in the main conduit, and means comprising said balanced member adapted to maintain proportionality between both the said flows.

21. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through the said second conduit, said regulating valve being variably operative under the control of opposing fluid pressures comprising said second conduit flow pressure and said main flow pressure, and means comprising said balanced member adapted to maintain proportionality between both the said flows.

22. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow pressure, said second conduit adapted to convey a fluid pressure from a source at higher pressure to a relatively lower pressure point in the said main conduit.

23. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow pressure, one of said communicated pressures being derived from the fluid flow in the main conduit, the other said opposing pressure being derived from said second conduit fluid flow, said second conduit adapted to convey a fluid pressure from a source at higher pressure to a relatively lower pressure point in the said main conduit.

24. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow regulated pressure, one of said communicated pressures being derived from the fluid flow in the main conduit, the other said opposing pressure being derived from said second conduit fluid flow.

25. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow regulated pressure, one of said communicated pressures being derived from the fluid flow in the main conduit, the other said opposing pressure being derived from said second conduit fluid flow, said second conduit being adapted to convey a divisional flow of said main conduit flow, between points of different pressures in the main conduit.

26. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow regulated pressure, one of said communicated pressures being derived from the fluid flow in the main conduit, the other said opposing pressure being derived from said second conduit fluid flow, said second conduit being adapted to convey a divisional flow of said main conduit flow, between points of different pressures in the main conduit, and means comprising said balanced member adapted to maintain proportionality between both the said flows.

27. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow regulated pressure, and means comprising said balanced member adapted to maintain proportionality between both the said flows.

28. In a fluid system, a main conduit adapted to convey a main flow, a throttle valve in the said conduit for regulating the said flow, a pair of fluid pressure cells, a movable element for said cells adapted to be moved responsive to a difference in pressures in the said cells, a second conduit adapted to convey a second fluid flow, a governing valve in the said second conduit operating under the control of the said movable element, said second conduit valve being adapted to be moved under the control of the said element toward closing position as the difference in pressures in the said cells increases, throttle valve actuating apparatus responsive to the different fluid flow restricting positions of the said second valve, whereby said throttle valve will move toward closing position when said second valve is moved toward wide open position, and means for communicating differing fluid pressures to the said cells.

29. In a fluid system, a main conduit adapted to convey a main flow, a throttle valve in the said conduit for regulating the said flow, a pair of fluid pressure cells, a movable element for said cells adapted to be moved responsive to a difference in pressures in the said cells, a second conduit adapted to convey a second fluid flow, a governing valve in the said second conduit operating under the control of the said movable element, said governing valve controlling the operation of the said throttle valve, a pair of pressure communicating ducts leading to the said cells, one of said ducts being adapted to communicate fluid pressure to one of said cells from a point in the said main conduit, means to communicate a pressure through the said second duct to the said second cell, pressure controlling means operable under the control of the movable element adapted to restore the pressures in the two cells toward equal pressure values, upon a departure from an equality of pressures therein.

30. In a fluid system, a main conduit adapted to convey a main flow, a throttle valve in the said conduit for regulating the said flow, a pair of fluid pressure cells, a movable element for said cells adapted to be moved responsive to a difference in pressures in the said cells, a second conduit adapted to convey a second fluid flow, a governing valve in the said second conduit operating under the control of the said movable element, said throttle valve being operated under the control of pressure derived from the said second conduit governed flow, a pair of pressure communicating ducts leading to the said cells, one of said ducts being adapted to communicate fluid pressure to one of said cells from a point in the said main conduit, means to communicate a pressure through the said second duct to the said second cell, pressure controlling means operable under the control of the movable element adapted to restore the pressures in the two cells toward equal pressure values, upon departure therefrom.

31. In fluid control systems, a conduit adapted to pass a fluid flow, a throttling valve in said conduit, a duct adapted to convey a controlling flow of fluid, a chamber connected to said duct, and a movable member for said chamber adapted to move said valve as a function of the difference between the rates of ingress and egress of fluid in said chamber, said conduit and said duct being each so formed in different portions of their length as to offer greater resistance to flow of fluid therethrough at one point than at some other point in the path of flow therein, and means operable to variably so restrain the flow through the duct as to substantially maintain proportionality between the pressures existing at the said points in the conduit to corresponding said points in the duct.

32. In fluid control systems, a conduit adapted to pass a fluid flow, a throttling valve in said conduit, a duct adapted to convey a controlling flow of fluid, a chamber connected to said duct and adapted to receive and discharge fluid, means variably responsive according to the pressure of fluid in the chamber for moving said throttling valve according to the difference between the rates of ingress and egress of fluid in said chamber, said conduit and said duct being each so formed in different portions of their length as to offer greater resistance to flow of fluid therethrough at one point than at some other point in the path of flow therein, and means operable to variably so restrain the flow through the duct as to substantially maintain proportionality between the pressures existing at the said points in the conduit to corresponding of the said points in the duct.

33. In fluid control systems, a conduit adapted to pass a fluid flow, a throttling valve in said conduit, a duct adapted to convey a flow of fluid, a chamber adapted to receive and discharge fluid, said chamber being connected to an intermediate portion of said duct, means responsive to the pressure existing at any time in said chamber for moving said throttling valve at a rate varying directly with the difference between the rates of flow toward and from said intermediate portion, said means responsive to the effects of pressure in the chamber to effect movement of the valve to an intermediate position relative to opened position of the valve according to the difference between the amounts of fluid flowing to and away from said intermediate portion and means for so controlling one of said rates of flow, as to substantially maintain proportionality between the rates of flows in the conduit and the duct.

34. In fluid control systems, a conduit adapted to pass a fluid flow, a throttling valve in said conduit, a duct adapted to convey a flow of fluid, a chamber adapted to receive and discharge fluid, said chamber being connected to an intermediate portion of said duct, means associated with said chamber for moving said throttling valve at a rate varying directly with the difference between the rates of flow toward and from said intermediate portion, said throttling valve also being moved a distance proportional to the difference between the amounts of fluid flowing to and away from said intermediate portion and means for regulating the rate of flow in the duct so as to maintain it substantially proportional to the rate of flow in said conduit, said throttling valve adapted to prevent the range of pressures in the conduit from exceeding the practical limits of efficient operation of said rate of flow regulating means for the duct.

35. The method of regulating a large main flow consisting in establishing a relatively small actuating flow, in regulating the actuating flow so as to cause it to be proportional to the main flow and separately controlling the main flow by oppositely acting pressures derived from said main and regulated actuating flows.

36. The method of regulating a large flow consitsing in establishing a relatively small flow by subtracting it from the main flow, in maintaining the actuating flow proportional to the main flow and controlling the main flow by oppositely acting pressures derived from said main and actuating flows, and directing said actuating flow into said main flow at a point of lower pressure than that at which it was derived, and maintaining the joined flows at the approach to the said point at substantially equal pressures.

37. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being operable under the control of pressure in the said second conduit, one of said communicated pressures being derived from the fluid flow in the main conduit, and means comprising said balanced member adapted to maintain the pressure of said flows equal to one another at one point in their pathway.

38. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being operably under the control of pressure in the said second conduit, one of said communicated pressures being derived from the fluid flow in the main conduit, and means comprising said balanced member adapted to govern the rate of flow of one of said flows at one point in its pathway by the rate of flow of the other of said flows.

39. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being operable under the control of pressure in the said second conduit, one of said communicated pressures being derived from the fluid flow in the main conduit, and means comprising said balanced member adapted to maintain said flows proportional to one another at one point in the pathway of said flows.

40. In a fluid system, a main conduit adapted to convey a fluid flow, a regulating valve in the main conduit, valve operating means controlling the said regulating valve, a second conduit adapted to conduct a second fluid flow, controlling means for the said second flow, said controlling means being operable under the control of opposing pressures to maintain an equality of pressures in the said main conduit and the said second conduit between the flows at one point in each of said conduits, said regulating valve operating means being variably operable according to the pressure in said second conduit on the approach side of said second flow controlling means.

41. In a fluid system, a main conduit adapted to convey a fluid flow, a regulating valve in the main conduit, valve operating means controlling the said regulating valve, a second conduit adapted to conduct a second fluid flow, controlling means for the said second flow, said controlling means being operable under the control of opposing pressures to maintain a proportionality of pressures in the said main conduit and the said second conduit between the flows at one point in each of said conduits, said regulating valve operating means being variably operable according to the pressure in said second conduit on the approach side of said second flow controlling means.

42. In a fluid system, a main conduit adapted to convey a fluid flow, a regulating valve in the main conduit, valve operating means controlling the said regulating valve, a second conduit adapted to conduct a second fluid flow, controlling means for the said second flow, said controlling means being operable under the control of opposing pressures to maintain an equality of pressures in the said main conduit and the said second conduit between the flows at one point in each of said conduits, said regulating valve operating means being variably operable according to the pressure in said second conduit on the approach side of said second flow controlling means, such second conduit pressure being adapted to move said valve toward open position, and means to cause such movement to be opposed by pressure communicated from said main conduit.

43. In a fluid system, a main conduit adapted to convey a fluid flow, a regulating valve in the main conduit, valve operating means controlling the said regulating valve, a second conduit adapted to conduct a second fluid flow, controlling means for the said second flow, said controlling means being operable under the control of opposing pressures to maintain an equality of pressures in the said main conduit and the said second conduit between the flows at one point in each of said conduits, said regulating valve operating means being variably operable according to the pressure in said second conduit on the approach side of said second flow controlling means, such second conduit pressure being adapted to move said valve toward open position, and means to cause such movement to be opposed by pressure communicated from said main conduit, on the discharge side of said valve.

44. In a fluid system, a main conduit adapted to convey a fluid flow, a regulating valve in the main conduit, valve operating means controlling the said regulating valve, a second conduit adapted to conduct a second fluid flow, controlling means for the said second flow, said controlling means being operable under the control of opposing pressures to maintain a constant pressure in the said main conduit, said regulating valve operating means being variably operable according to the pressure in said second conduit on the approach side of said second flow controlling means, such second conduit pressure being adapted to move said valve toward open position, and means to cause such movement to be opposed by pressure communicated from said main conduit.

45. In a fluid system, a main conduit adapted to convey a fluid flow, a regulating valve in the main conduit, valve operating means controlling the said regulating valve, a second conduit adapted to conduct a second fluid flow, controlling means for the said second flow, said controlling means being operable under the control of opposing pressures to maintain a constant pressure in the said main conduit, said regulating valve operating means being variably operable according to the pressure in said second conduit on the approach side of said second conduit controlling means, such second conduit pressure being adapted to move said valve toward open position, and means to cause such movement to be opposed by pressure communicated from said main conduit, on the discharge side of said valve.

46. In a fluid system, a main conduit adapted to convey a fluid flow, a regulating valve in the main conduit, valve operating means controlling the said regulating valve, a second conduit adapted to conduct a second fluid flow, controlling means for the said second flow, said controlling means being operable under the control of opposing pressures to maintain an equality of pressures in the said main conduit and the said second conduit between the flows at one point in each of said conduits, said regulating valve operating means being variably operable according to the rate of flow in said second conduit on the approach side of said second flow controlling means, such second conduit pressure being adapted to move said valve toward open position, and means to cause such movement to be opposed by pressure communicated from said main conduit.

47. In a fluid flow regulating system, the combination with a first conduit for fluid flow under pressure, a first throttling valve in said conduit, said valve being differentially responsive to a plurality of pressures one of which being a regulating pressure, said valve being moved to different flow throttling positions according to the value of the regulating pressure, a second conduit for flow of fluid which exerts at least at one point therein, a pressure of value equal to said regulating pressure, a second throttling valve in said second conduit, a fluid division differentially movable responsive to a departure from equality of fluid pressures on its two sides, valve means responsive to movement of said division to vary the pressure exerted on at least one side of said division, to restore the equality of fluid pressures acting on said division, one of said pressures being at all times equal to the pressure at one point in one of said conduits.

48. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being operable under the control of pressure in the said second conduit, one of said communicated pressures being derived from the fluid flow in the main conduit, the other said opposing pressure being derived from said second conduit fluid flow, said second conduit adapted to convey a fluid pressure from a source at higher pressure to a relatively lower pressure point in the said main conduit.

49. In a fluid system, a main conduit adapted to convey a fluid flow, a regulating valve in the main conduit, a fluid pressure cell, a second fluid pressure cell, a balanced member differentially operative by opposing pressure in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow pressure, said second conduit being adapted to convey a divisional flow of said main conduit flow, between points of different pressures in the main conduit.

50. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow regulated pressure, one of said communicated pressures being derived from the fluid flow in the main conduit.

51. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow regulated pressure, said second conduit being adapted to convey a divisional flow of said main conduit flow, between points of different pressures in the main conduit.

52. In a fluid system, a main conduit adapted to convey a fluid flow, a regulating valve in the main conduit, a fluid pressure cell, a second fluid pressure cell, a balanced member differentially operative by opposing pressures in the said cells, a second conduit adapted to conduct a fluid flow, means to communicate opposing pressures to both said cells, said balanced member adapted to control the flow through said second conduit, said regulating valve being variably operative under the control of opposing fluid pressures comprising said second conduit flow pressure and said main flow regulated pressure, one of said communicated pressures being derived from the fluid flow in the main conduit, and means comprising said balanced member adapted to maintain proportionality between both the said flows.

53. The method of regulating a fluid flow consisting in effecting a second fluid flow induced by a determinable head, then regulating the first fluid flow by a pressure derived from said second fluid flow, then in controlling the second fluid flow by oppositely acting fluid pressures, one of which is derived from the first fluid flow and meanwhile maintaining the oppositely acting fluid pressures equal to one another, while continuously maintaining the rate of flow in the said second fluid flow at one point in its pathway proportional to the regulated fluid flow.

54. The method of regulating a fluid flow which consists in effecting another fluid flow induced by a determinable head, in regulating said other fluid flow to the rate of said first named flow and separately controlling said first named flow by a pair of oppositely acting fluid pressures, one of which is derived from said second named flow, while continuously maintaining the rate of flow in the said second fluid flow at one point in its pathway proportional to the regulated fluid flow.

55. The method of regulating a fluid flow which consists in establishing a second fluid flow induced by a determinable head, in controlling the first named fluid flow by a plurality of fluid pressures, one of which is connected with said second named fluid flow and controlling said second named fluid flow by two opposed fluid pressures, one of which is connected with said first named flow and maintaining one of said opposed fluid pressures equal to the other of said opposed fluid pressures, while continuously maintaining the rate of flow in the said second fluid flow at one point in its pathway proportional to the regulated fluid flow.

56. The method of regulating a fluid flow which consists in establishing a second fluid flow induced by a determinable head, in controlling said first named flow by a plurality of pressures, one of which is connected with said second named flow and controlling said second named flow by two opposed fluid pressures one of which is connected with said first named flow and the other of which is connected with said second named flow and maintaining the last named opposed pressure equal to the first named proposed pressure, while continuously maintaining the rate of flow in the said second fluid flow at one point in its pathway proportional to the regulated fluid flow.

57. The method of regulating a fluid flow which consists in establishing a second fluid flow, in controlling said first named flow by a plurality of pressures, one of which is connected with said second named flow and controlling said second named flow by two opposed fluid pressures, one of which is connected with said first named flow and the other of which is connected with said second named flow and continuously maintaining the rate of flow of the second named fluid flow at one point in its pathway proportional to the rate of the first named fluid flow.

58. In a fluid system, a first conduit for fluid flow, a second conduit for regulating fluid flow, a first counter-pressure element, a second counter-pressure element, said second counter-pressure element adapted to be maintained in equi-poise by equal oppositely directed pressures, said two pressures being derived from points in the two conduits, and means comprising said second counter-pressure element adapted to govern the second conduit to maintain a rate of flow therein proportional to that in the first conduit, a valve controlling the flow through the first conduit, means tending to exert a predetermined force tending to close said valve, means to communicate motion from said first counter-pressure element to said valve, means to communicate a pair of opposing fluid pressures to the two sides of said first counter-pressure element, one of said fluid pressures being communicated from said second conduit, the other being communicated from said first conduit, said first counter-pressure element adapted to position said valve under the joint control of the opposing pressures operating upon it and the effect of the valve weighting, tending to close the valve.

In witness whereof I have hereunto signed my name this 17th day of March, 1922.

GEORGE GOODELL EARL.